United States Patent
Lund (10) Patent No.: US 8,427,848 B2
(45) Date of Patent: Apr. 23, 2013

(54) VARIABLE TIME CLAMP FOR A POWER SUPPLY CONTROLLER

(75) Inventor: Leif Lund, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 303 days.

(21) Appl. No.: 12/976,771

(22) Filed: Dec. 22, 2010

(65) Prior Publication Data

US 2012/0161739 A1 Jun. 28, 2012

(51) Int. Cl.
*H02M 3/335* (2006.01)

(52) U.S. Cl.
USPC ....... 363/21.12; 363/18; 363/21.04; 323/207; 323/222; 323/282

(58) Field of Classification Search .................... 363/18, 363/19, 20, 21.01, 21.04, 21.07, 21.08, 21.09, 363/21.12, 21.15, 21.16, 21.17; 323/207, 323/222, 271, 282, 284, 285
See application file for complete search history.

(56) References Cited

U.S. PATENT DOCUMENTS

| 7,075,802 B2 * | 7/2006 | Yamashita | 363/21.12 |
| 8,279,631 B2 * | 10/2012 | Yang | 363/21.12 |
| 2010/0315841 A1 * | 12/2010 | Saji | 363/21.12 |
| 2010/0320974 A1 * | 12/2010 | Manlove et al. | 323/222 |
| 2011/0157923 A1 * | 6/2011 | Ren et al. | 363/21.12 |

* cited by examiner

*Primary Examiner* — Nguyen Tran
(74) *Attorney, Agent, or Firm* — Blakely Sokoloff Taylor & Zafman LLP (57) ABSTRACT

An example integrated circuit for use in a power supply includes a feedback terminal and a controller having a variable time clamp (VTC). The feedback terminal is to be coupled to receive a feedback signal and the controller is to be coupled to enable or disable the conduction of a power switch during a switching cycle in response to the feedback signal. The controller includes a current limit comparator coupled to terminate the conduction of the power switch during an enabled switching cycle in response to a current through the power switch exceeding a variable current limit. The VTC is coupled to clamp the feedback terminal to a voltage for a clamp time that is responsive to the variable current limit.

25 Claims, 5 Drawing Sheets

VARIABLE TIME CLAMP FOR A POWER SUPPLY CONTROLLER

TECHNICAL FIELD

This disclosure relates generally to switching power supplies, and in particular but not exclusively, relates to controllers for switching power supplies.

BACKGROUND INFORMATION

Many electrical devices such as cell phones, personal digital assistants (PDA's), laptops, etc. are powered by a source of relatively low-voltage DC power. Because power is generally delivered through a wall outlet as high-voltage AC power, a device, typically referred to as a power supply, is required to transform the high-voltage AC power to low-voltage DC power. The low-voltage DC power may be provided by the power supply directly to the device or it may be used to charge a rechargeable battery that, in turn, provides energy to the device, but which requires charging once stored energy is drained. Typically, the battery is charged with a battery charger that includes a power supply that meets constant current and constant voltage requirements required by the battery. In operation, a power supply may use a controller to regulate output power delivered to an electrical device, such as a battery, that may be generally referred to as a load. More specifically, the controller may be coupled to receive feedback information about the output of the power supply in order to regulate power delivered to the load. The controller regulates power to the load by controlling a power switch to turn on and off in response to the feedback information to transfer energy pulses to the output from a source of input power such as a power line.

One particular type of power supply that may be used is a flyback power supply. In one type of flyback power supply, an energy transfer element isolates the input of the power supply from the output of the power supply. The energy transfer element provides the isolation that prevents DC current from flowing between the input and the output.

A typical way to generate a feedback signal for use by the controller in a flyback power supply and still maintain isolation is to use an optocoupler on the output to send a signal to the controller. Another known way is by using sensing circuitry on the input side of a galvanically isolated power supply, also referred to as "primary-side control". One example of primary side control is to include an additional "auxiliary" or "bias" winding in the energy transfer element that is magnetically coupled to the output side to generate a voltage that is representative of the output of the power supply. Additionally, the bias winding may provide a voltage that is representative of an input voltage of the power supply.

However, utilizing the waveforms generated on the auxiliary winding often requires the inclusion of numerous electrical components external to the controller to condition the signals for receipt by the controller.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an apparatus and method for clamping a voltage on a feedback terminal are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

In short, embodiments of the present invention include a variable time clamp for a power supply controller that clamps the voltage on a feedback terminal for a duration of time, referred to as a clamp time, that is responsive to a variable switch current limit of the power switch. Having a clamp time that is responsive to a variable switch current limit allows the controller to receive accurate feedback information of the output during a longer duration while also preventing the forward biasing of one or more substrate diodes included in the controller. These and other embodiments are described in detail below.

Figure 1:
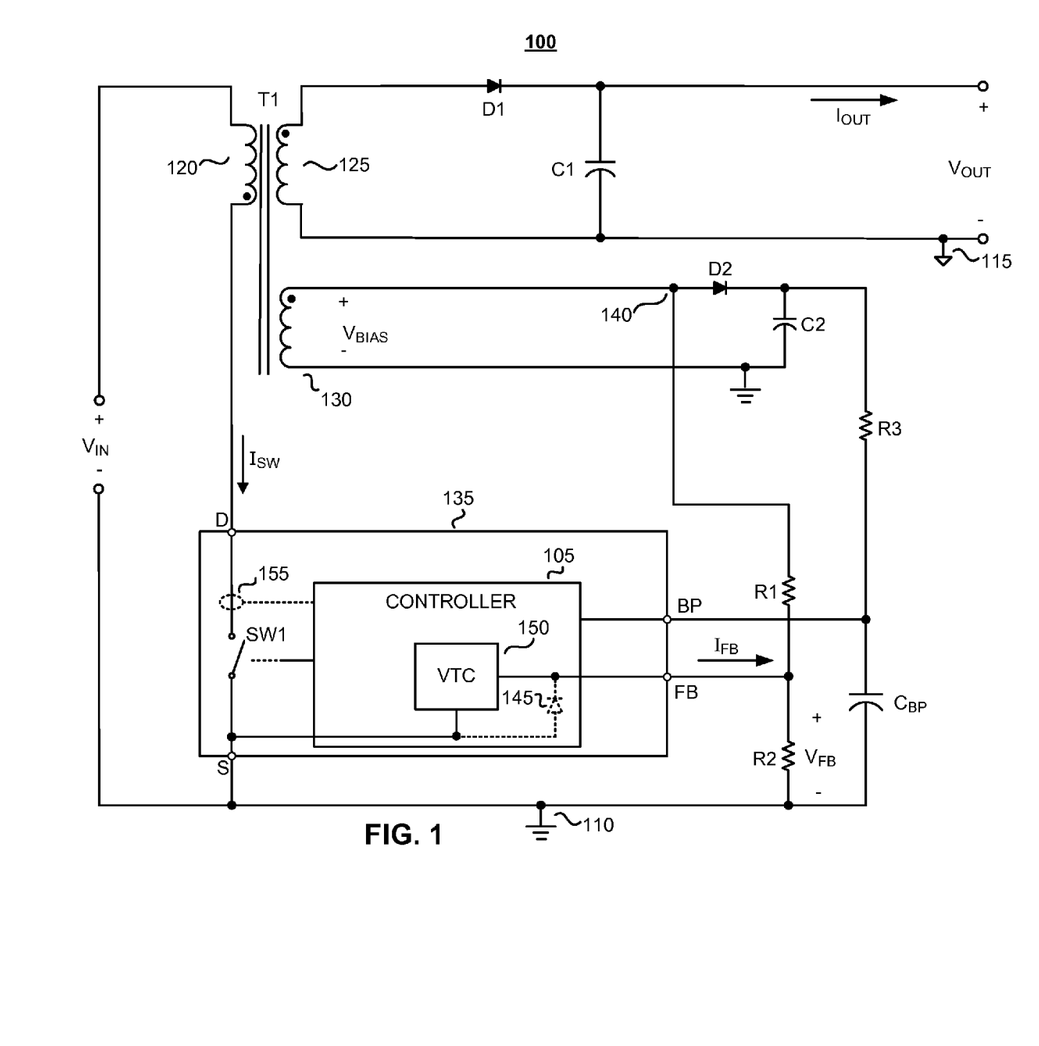
FIG. 1 is a functional block diagram illustrating a power supply, in accordance with an embodiment of the invention.

FIG. 1 is a functional block diagram illustrating a power supply 100, sometimes referred to as a power supply, in accordance with embodiments of the invention. The illustrated example of power supply 100 includes an energy transfer element T1, a rectifier D1, an output capacitor C1, a feedback circuit (e.g., resistors R1 and R2), a supply circuit (e.g., diode D2, capacitor C2, resistor R3, and bypass capacitor $C_{BP}$), a controller 105, a power switch SW1, an input return 110, and an output return 115.

In the example shown in FIG. 1, power supply 100 is a power supply having a flyback topology. However, there are many other known topologies and configurations of switching power supplies that could also employ variable time clamping in accordance with the teachings of the present implementations.

Power supply 100 provides output power to a load (not shown) from a semi-unregulated input voltage $V_{IN}$. In one example, input voltage $V_{IN}$ is a semi-unregulated DC voltage that may be derived from an AC voltage. The input voltage $V_{IN}$ is coupled to energy transfer element T1 and to power switch SW1. In the example of FIG. 1, the energy transfer element T1 is a transformer having a primary winding 120, a secondary winding 125, and a bias winding 130. A "primary winding" may also be referred to as an "input winding", a "secondary winding" may also be referred to as an "output winding", and a "bias winding" may also be referred to as an "auxiliary winding."

The example of FIG. 1 illustrates galvanic isolation between the input side that is electrically coupled to an input return 110 and an output side that is electrically coupled to output return 115. In other words, a dc current is substantially prevented from flowing between the input side and the output side of power supply 100.

In operation, power switch SW1 is closed, thereby allowing current to conduct, and opened, thereby substantially terminating switch current $I_{SW}$ through power switch SW1, in response to controller 105. Thus, a switch that is closed may be referred to as being in an "ON" state, whereas a switch that is open may be referred to as being in an "OFF" state. In one example, power switch SW1 is a transistor, such as a metal oxide semiconductor field effect transistor (MOSFET).

In one example, controller 105 and power switch SW1 may be included in an integrated circuit 135 having a drain terminal D, a source terminal S, a bypass terminal BP, and a feedback terminal FB. In another example, controller 105 may be implemented with discrete electrical components or a combination of discrete and integrated circuits. During operation of the power supply 100, the switching of power switch SW1 produces a pulsating current in the rectifier D1 that is filtered by capacitor C1 to produce a substantially constant output voltage $V_{OUT}$, output current $I_{OUT}$, or a combination of the two at the output of power supply 100.

As shown in FIG. 1, integrated circuit 135 includes a current sense 155 that senses a switch current $I_{SW}$ flowing through switch power switch SW1. Any of the many known ways to measure a switch current, such as for example a current transformer, or the voltage across a discrete resistor, or the voltage across a transistor when the transistor is conducting, may be used to measure the switch current $I_{SW}$.

In operation, controller 105 operates switch SW1 to substantially regulate the output of power supply 100 to a desired value. Controller 105 typically includes an oscillator that defines a switching cycle of duration $T_{SW}$. Regulation may be accomplished by implementing an "ON/OFF" control that allows switch SW1 to either conduct for a portion of a switching cycle (ON) or to prevent conduction in a switching cycle (OFF). More specifically, an "ON" cycle may be defined as a switching cycle wherein the power switch is enabled, and therefore, may conduct current during that switching cycle and an "OFF" cycle may be defined as a switching cycle wherein the power switch is disabled, or prevented from substantially conducting during that switching cycle. In addition, other switching parameters that effect regulation may be controlled during "ON/OFF" control. In one example, the maximum value of switch current $I_{SW}$ is set by an internal current limit. Typically, the current limit may be adjusted to avoid operating at switching frequencies in the audible noise range and/or improving efficiency during regulation of power supply.

As shown, an external bypass capacitor $C_{BP}$, shown in FIG. 1, is coupled to the bypass terminal BP to store energy to provide an internal supply voltage to power the internal circuits of integrated circuit 135.

Also shown in the depicted example, is a feedback circuit (e.g., resistors R1 and R2) coupled to node 140 to provide a feedback voltage $V_{FB}$ that gives an indication of whether the output voltage is higher or lower than a reference value when power switch SW1 is the OFF state, and an feedback current $I_{FB}$ that is representative of the input voltage when the power switch SW1 is in the ON state. In one example, feedback current $I_{FB}$ may be representative of input voltage $V_{IN}$. In one example, the bias voltage $V_{BIAS}$ may be representative of output voltage $V_{OUT}$ for only a portion of the time power switch SW1 is in the OFF state and may be representative of input voltage $V_{IN}$ for a substantial amount of time power switch SW1 is in the ON state.

In operation, when power switch SW1 is in the OFF state, switch current $I_{SW}$ is substantially prevented from flowing through power switch SW1 and energy stored in input winding 120 is transferred to output winding 125 by allowing output diode D1 to conduct which allows bias voltage $V_{BIAS}$ to be a voltage that is proportional to output voltage $V_{OUT}$. Bias voltage $V_{BIAS}$ may be proportional to the output voltage $V_{OUT}$ by a proportion of a number of turns in bias winding 130 to the number of turns in output winding 125. As shown, bias winding 130 is magnetically coupled to output winding 125 and also shares the same polarity.

When power switch SW1 transitions from the OFF state to the ON state switch current $I_{SW}$ is allowed to flow through input winding 120 which creates a voltage across output winding 125 that is proportional to input voltage $V_{IN}$. Bias voltage $V_{BIAS}$ may be proportional to input voltage $V_{IN}$ by a proportion of a number of turns in bias winding 130 to a number of turns in input winding 120. Also, due to the configuration of the bias winding 130, the bias voltage $V_{BIAS}$ reverses polarity during the ON state of power switch SW1. For example, bias voltage $V_{BIAS}$ may have a positive voltage with respect to input return 110 when power switch SW1 is in the OFF state and may have a negative voltage with respect to input return 110 when power switch SW1 is in the ON state.

The illustrated example of FIG. 1 shows controller 105 as including a substrate diode 145, also referred to herein as a body diode. This substrate diode 145 may result from one or more PN junctions formed between the feedback terminal FB and source terminal S when controller 105 is fabricated as part of integrated circuit 135. During operation, when the feedback terminal FB is at or above the voltage potential of source terminal S, current is substantially prevented from flowing through substrate diode 145. However, should the feedback terminal FB be pulled below the voltage potential of source terminal S, substrate diode 145 may become forward biased causing failure or improper operation of controller 135, by for example, effectively shorting feedback terminal FB to source terminal S. Accordingly, embodiments of the present implementations include a variable time clamp (VTC) 150 to clamp a voltage at feedback terminal FB to substantially prevent forward biasing of substrate diode 145. In other examples, VTC 150 may minimize current flowing through substrate diode 145.

In one embodiment, "clamping a voltage" may be interpreted as limiting voltage to a maximum or minimum value. According to the teachings of the present implementation, 'clamping a voltage' may also be referred to as 'setting' the voltage at feedback terminal FB to a substantially certain value. In particular, the value may be limited to substantially the potential at source terminal S, which in the illustrated example, is coupled to input return 110. In other words, the voltage at feedback terminal FB is limited from going substantially below the potential voltage at source terminal S.

In one example, VTC 150 clamps the voltage at feedback terminal FB when the bias voltage $V_{BIAS}$ is negative with respect to input return 110. However, the time that the bias voltage $V_{BIAS}$ is negative varies, due in part, to the peak value of switch current $I_{SW}$ in the power switch SW1. For example, the time that it takes the bias voltage $V_{BIAS}$ to transition from a negative potential to a positive potential after the power switch SW1 has turned off is greater for a switch current $I_{SW}$ with a lower peak value than it is for a switch currents $I_{SW}$ with a relatively higher peak value. In one example, the variable clamp time is long enough to cover the time it takes for the bias voltage $V_{BIAS}$ to change polarity (cross zero volts) and at the same time is short enough to not substantially extend beyond the time when $V_{BIAS}$ changes polarity to allow bias voltage $V_{BIAS}$ to represent output voltage $V_{OUT}$ for the longest possible duration. Thus, in one example, VTC 150 may be configured to clamp the voltage on the feedback terminal FB for a clamp time that is responsive to a peak switch current. The peak switch current may be the highest current through power switch when power switch is conducting. In one example, the peak value of switch current $I_{SW}$ is controlled by the current limit of the power switch. These and other embodiments will be discussed in greater detail below.

Figure 2:
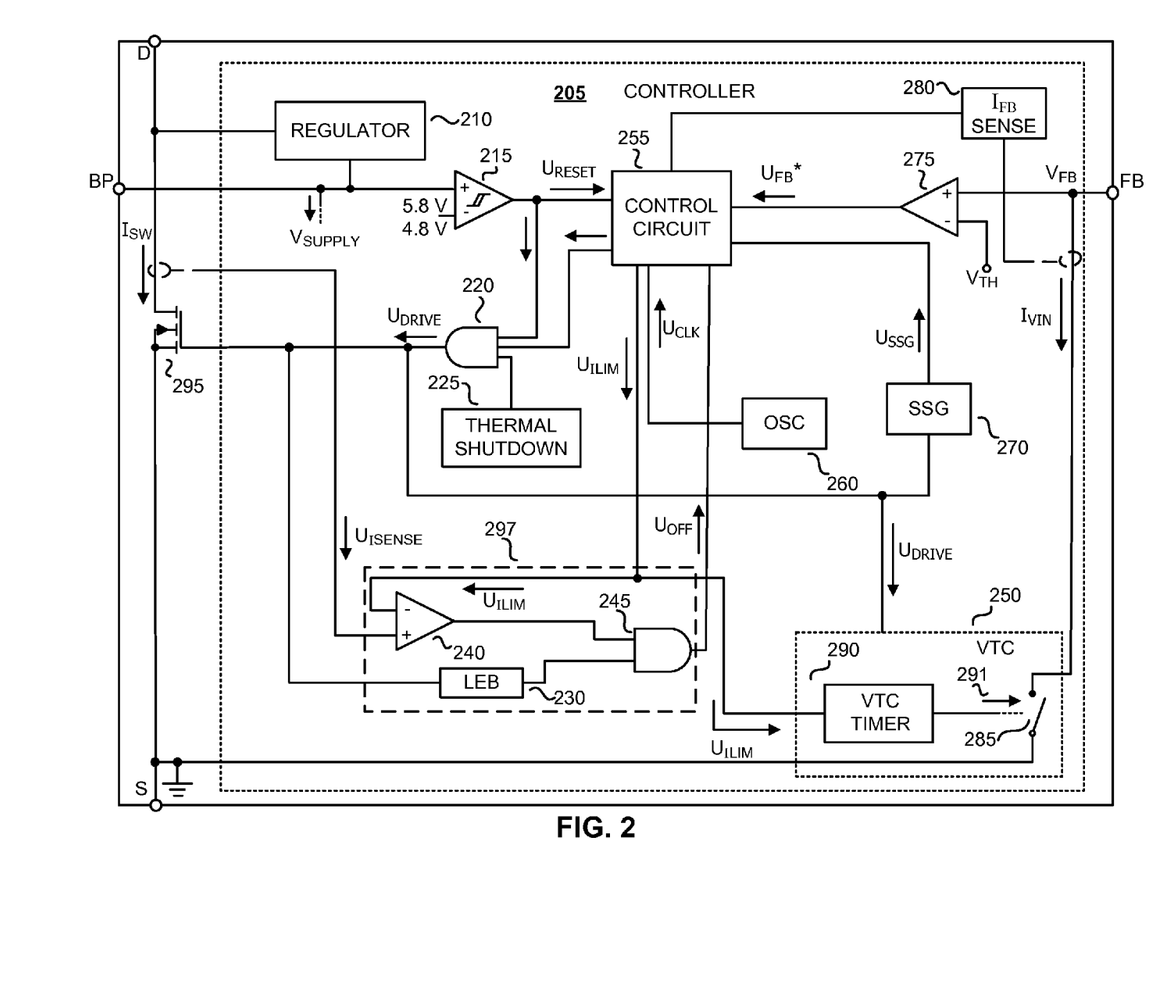
FIG. 2 is a functional block diagram illustrating a power supply controller, in accordance with an embodiment of the invention.

FIG. 2 is a functional block diagram illustrating a power supply controller 205 and integrated circuit 235, in accordance with an embodiment of the implementation. Controller 205 and integrated circuit 235 are possible implementations of controller 105 and integrated circuit 135, respectively, of FIG. 1. Controller 205 is illustrated as including a voltage regulator 210, a hysteretic comparator 215, a drive signal logic gate 220, a thermal shutdown circuit 225, a current limit detection circuit 297, variable time clamp (VTC) 250, a control circuit 255, an oscillator 260 a flip-flop 265, a sampling signal generator (SSG) 270, a comparator 275, and a feedback current sense circuit ($I_{FB}$ SENSE) 280. As shown, VTC 250 is illustrated as including a clamp switch 285 and a variable time clamp timer (VTC TIMER) 290. As shown, current limit detection circuit 297 includes a lead edge blanking (LEB) circuit 230, comparator 240, and a logic AND gate 245.

In the example of FIG. 2, a power switch, shown as MOSFET 295, switches a switch current $I_{SW}$ between drain terminal D and source terminal S in response to a drive signal $U_{DRIVE}$ from drive signal logic gate 220. Optional voltage regulator 210 is coupled to the drain terminal D and regulates the voltage on the bypass terminal BP to a supply voltage. In one example, supply voltage may be 5.8 volts. As shown, bypass terminal BP provides an internal supply voltage $V_{SUPPLY}$ to power the internal circuits of integrated circuit 235. An external bypass capacitor $C_{BP}$, as shown in FIG. 1, may be coupled to the bypass terminal BP to store energy to power the internal circuits of integrated circuit 235 while the MOSFET 295 is on.

Optional hysteretic comparator 215 monitors the internal supply voltage $V_{SUPPLY}$ against a reference voltage. The hysteresis of comparator 215 causes the reference voltage to be either 4.8 volts or 5.8 volts. The hysteretic comparator 215 generates a reset signal $U_{RESET}$ that goes low to turn off the MOSFET 295 through AND gate 220 when the internal supply voltage $V_{SUPPLY}$ falls below 4.8 volts. When the internal supply voltage $V_{SUPPLY}$ rises to 5.8 volts, the reset signal $U_{RESET}$ of hysteretic comparator 215 goes high, and the reference voltage drops to 4.8 volts.

As shown in the depicted example, the output of hysteretic comparator 215 provides reset signal $U_{RESET}$ to control circuit 255. It is appreciated that in other examples, other internal or external circuits may provide reset signal $U_{RESET}$ as necessary for a given application. A transition from low to high of reset signal $U_{RESET}$ initializes the control circuit 255. In operation control circuit 255 may use one or more various methods of control where a peak value of switch current $I_{SW}$ through MOSFET 295 changes between switching cycles, for example, PWM, ON/OFF control, current mode control, fixed frequency control to provide drive signal $U_{DRIVE}$ to switch power switch 295 in accordance with the teachings of the present implementation.

As shown, AND gate 220 receives the reset signal $U_{RESET}$, a thermal shutdown signal from optional thermal shutdown circuit 225, and an output signal from control circuit 255. Drive signal $U_{DRIVE}$ from the output of AND gate 220 goes low to turn off the MOSFET 295 whenever either the reset signal $U_{RESET}$ or the thermal shutdown signal goes low. The thermal shutdown circuit 225 causes the thermal shutdown signal to go low when the junction temperature of the integrated circuit exceeds a threshold temperature value. Thus, the thermal shutdown circuit 225 causes the MOSFET 295 to turn off when the junction temperature of the integrated circuit is too high.

As shown in the depicted example, oscillator 260 provides a digital clock signal CLK to the control circuit 255. In the depicted example, clock signal CLK sets the switching frequency or in other words the duration of a switching cycle. In one example, the duration of each switching cycle is approximately 10 microseconds.

Comparator 275 compares a feedback voltage $V_{FB}$ at the feedback terminal FB to a threshold $V_{TH}$. Control circuit 255 receives the output of comparator 275 to produce a digital feedback signal $U_{FB}$ at a sampling time determined by a sampling signal generated by sampling signal generator 270. The sampling time is the time the MOSFET 295 turns off, delayed by a sample delay time. Sampling signal generator 270 delays the drive signal $U_{DRIVE}$ by the sample delay time, and generates a sampling signal $U_{SSG}$ at the delayed falling edge of the drive signal $U_{DRIVE}$. In one example, the sample delay time is 2.5 microseconds.

As shown an input voltage sensor 280 is coupled to feedback terminal FB and senses an input voltage current $I_{VIN}$ through feedback terminal FB that is representative of an input voltage $V_{IN}$. In operation, when MOSFET 295 is conducting, feedback terminal FB is substantially clamped to the potential voltage at source S and a voltage across bias winding that is representative of the input voltage is sensed by sensing current $I_{VIN}$ through feedback terminal FB. In this manner, bias winding coupled to feedback terminal FB may be used to sense an input voltage $V_{IN}$ when MOSFET 295 is conducting.

In operation, current limit comparator 240 compares a current sense signal $U_{ISENSE}$, which is proportional to the current in MOSFET 295, with a current limit signal $U_{ILIM}$ set by control circuit 255. In one example, the current limit signal $U_{ILIM}$ is representative of a peak value of a switch current $I_{SW}$ when MOSFET 295 is in the ON state. In one example, control circuit 255 may adjust current limit signal $U_{ILIM}$, thus adjusting the peak value of switch current $I_{SW}$, in response to a control scheme to regulate the output of a power supply. The output of the current limit comparator 240 goes high to indicate when the current in MOSFET 295 reaches a current limit represented by $U_{ILIM}$. Drive signal $U_{DRIVE}$ is delayed by leading edge blanking circuit 230 before being applied to the input of AND gate 245 to prevent the OFF signal $U_{OFF}$ provided to the control circuit 255 from indicating a false current limit condition when MOSFET 295 initially discharges stray capacitance coupled to node D and the switch current momentarily spikes beyond a current limit threshold.

In response to OFF signal $U_{OFF}$ indicating that the current in MOSFET 295 has reached the current limit, control circuit 255 outputs a low signal to AND gate 220 such that drive signal $U_{DRIVE}$ goes low and terminates conduction of MOSFET 295.

Thus, control circuit 255 enables or disables the MOSFET 295 from conducting in each switching cycle, controls the termination of conduction during an enabled cycle, and also limits the peak value of switch current $I_{SW}$ by switching MOSFET 295 to an OFF state in accordance with the teachings of the present implementation. FIG. 2 also illustrates variable time clamp VTC 250 as receiving the current limit signal $U_{ILIM}$ and the drive signal $U_{DRIVE}$. As shown, VTC timer 290 generates a control signal 291 to control clamp switch 285. In one embodiment, VTC timer 290 enables clamp switch 285 to selectively couple the feedback terminal FB to the source terminal S, which as shown in FIG. 1 may be coupled to input return 110 of power supply 100. VTC timer 290 enables clamp switch 285 for a clamp time $t_{CLAMP}$ that is responsive to the current limit signal $U_{ILIM}$. In one example, the clamp time $t_{CLAMP}$ is equal to an ON time $T_{ON}$ of MOSFET 295, as indicated by the drive signal $U_{DRIVE}$, plus a delay time $t_D$. In one example, the delay time $t_D$ is to account for the time that it takes the bias voltage $V_{BIAS}$ to rise back to a positive voltage (i.e. reach zero volts). However, as stated above this "recovery time" of the bias winding 130 is variable, due in part to the peak value of switch current $I_{SW}$ through the MOSFET 295. Accordingly, the delay time $t_D$ may also be variable and may be determined by VTC timer 290 responsive to the current limit signal $U_{ILIM}$, which as discussed above is representative of a peak value of switch current $I_{SW}$, or in other words, the maximum switch current $I_{SW}$ through the power switch during an ON state. In one embodiment, the delay time $t_D$ is proportional to the current limit set by control circuit 255.

Figure 3:
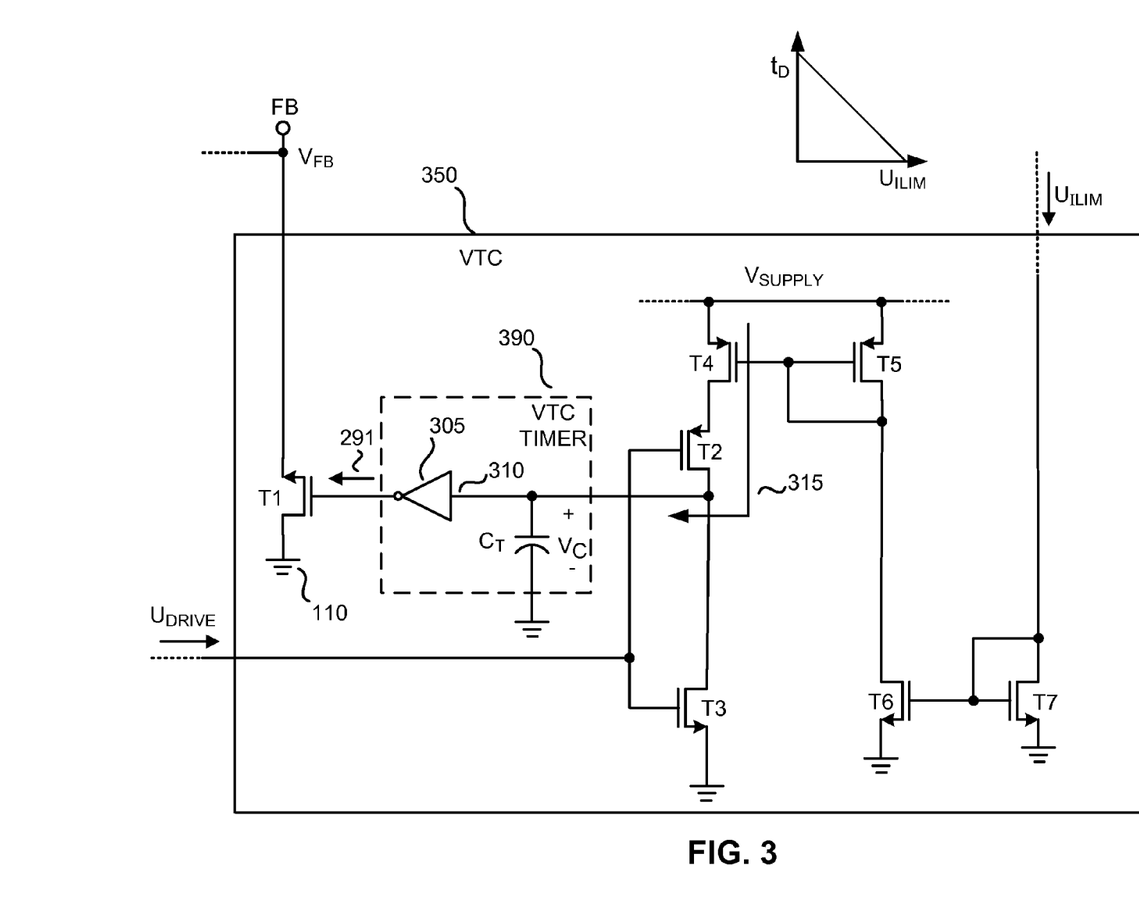
FIG. 3 is a schematic diagram illustrating a variable time clamp, in accordance with an embodiment of the invention.

FIG. 3 is a schematic diagram illustrating a variable time clamp (VTC) 350, in accordance with teachings of an implementation. VTC 350 is one possible implementation of VTC's 150 and 250 of FIGS. 1 and 2, respectively. VTC 350 is illustrated as including a clamp switch T1, switches T2 and T3, transistors T4-T7, and VTC timer 390. VTC timer 390 is illustrated as including a timing capacitor $C_T$ and a control signal generator 305.

As shown in FIG. 3, control signal generator 305 may be implemented as a logic gate, such as the illustrated inverter 305. In one example, control signal generator may also be an inverter 305. Inverter 305 may generate control signal 291 in response to input 310 of inverter 305. When the input 310 is a logic high, the output of inverter 305 goes low thereby disabling (i.e., opening) clamp switch T1. However, in order for the inverter 305 to register a logic high at input 310, the voltage at input 310 must be at or higher than a timing voltage threshold $V_t$.

As discussed above, VTC timer 390 enables clamp switch T1 for a clamp time $t_{CLAMP}$, that in one example, is equal to the ON time $T_{ON}$ of the power switch plus a delay time $t_D$. Accordingly, VTC 350 includes a switch T3 that is coupled to receive the drive signal $U_{DRIVE}$. When the drive signal $U_{DRIVE}$ indicates that the power switch is on (e.g., drive signal is a logic high value) then switch T3 is also enabled which allows timing capacitor $C_T$ to discharge, by providing a discharge path to input return 110. The discharging of the timing capacitor $C_T$ ensures that the voltage on the capacitor $V_C$ is less than the voltage threshold $V_t$, thus enabling the clamp switch T1 and beginning the clamp time $t_{CLAMP}$ of clamping the voltage at the feedback terminal FB.

When the drive signal $U_{DRIVE}$ indicates that the power switch is subsequently disabled (e.g., drive signal switches to a logic low value) then switch T3 is disabled and switch T2 is enabled which provides a path for current 315 to begin charging the timing capacitor $C_T$. Once the voltage $V_C$ on timing capacitor $C_T$ reaches the voltage threshold, inverter 305 disables the clamp switch T1 and thereby ends the present clamp time $t_{CLAMP}$. In one embodiment, the time that it takes timing capacitor $C_T$ to charge to the voltage threshold $V_T$ is the delay time $T_D$ mentioned above.

As shown in FIG. 3, VTC 350 is coupled to receive the current limit signal $U_{ILIM}$, which as discussed above is representative of the current limit of the power switch set by control circuit 255 (e.g., see FIG. 2). Transistors T6 and T7 are coupled together as a current mirror to mirror the current limit signal $U_{ILIM}$. Thus, in one embodiment current 315 that is provided to charge the timing capacitor $C_T$ is representative of the current limit. In one example, the time that it takes timing capacitor $C_T$ to charge to the voltage threshold $V_T$ from a discharged state (i.e., delay time $t_D$) is dependent on the magnitude of current 315. Therefore, as shown in FIG. 3, the delay time $t_D$ may be responsive to the current limit and in one example is proportional to the current limit.

Figure 4:
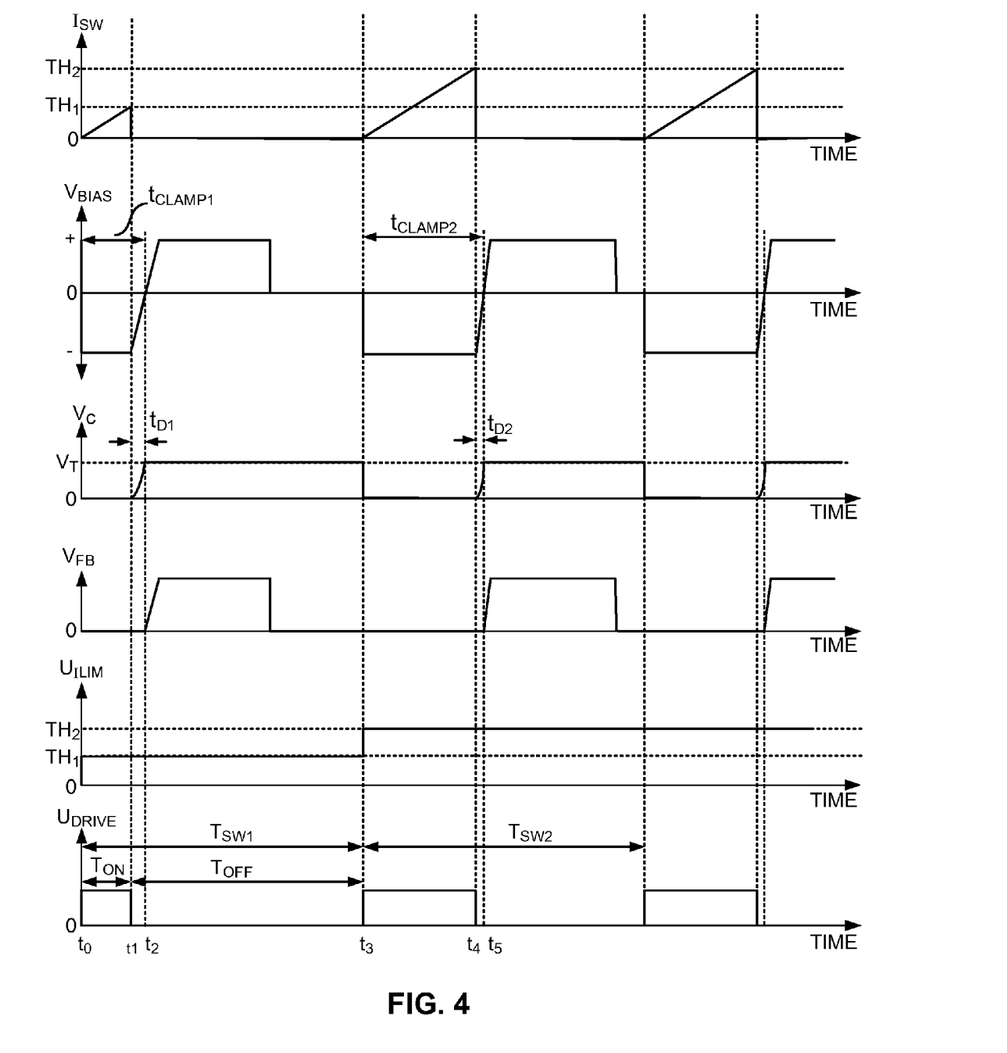
FIG. 4 is a timing diagram illustrating various signals of a power supply over several switching cycles, in accordance with an embodiment of the invention.
Figure 5:
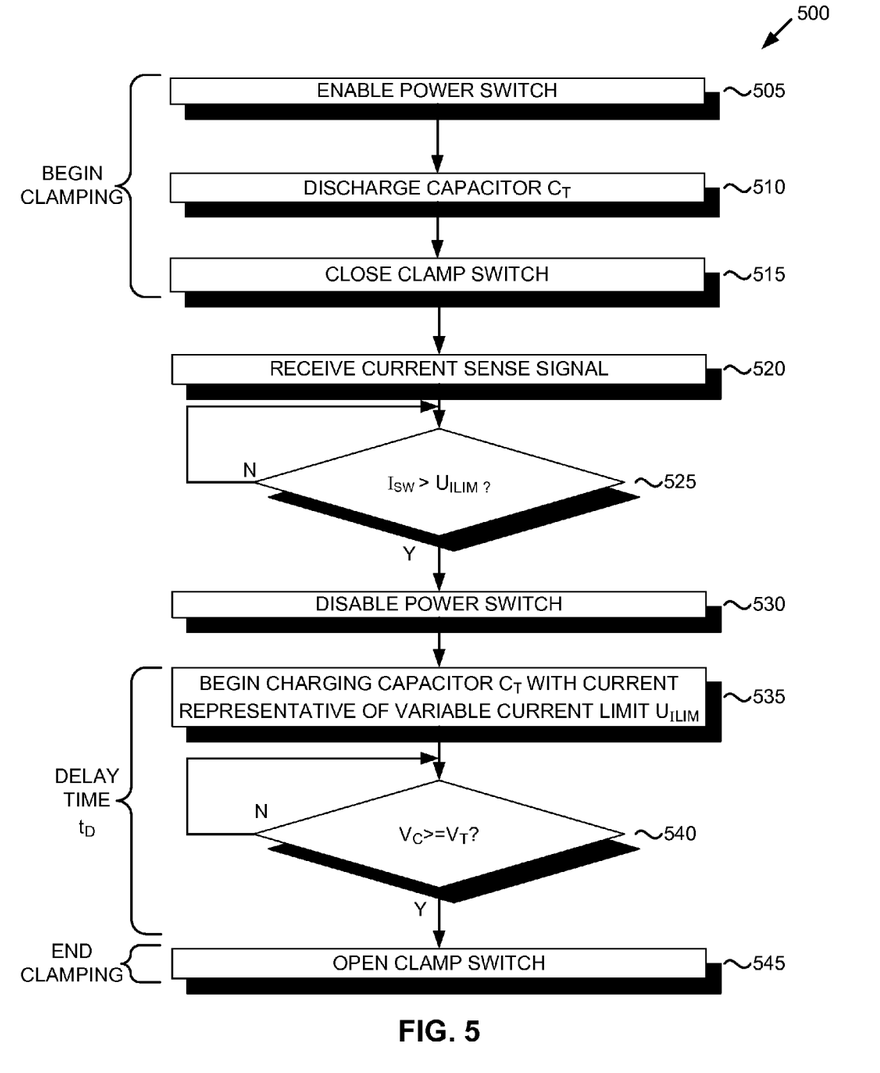
FIG. 5 is a flow chart illustrating a process of variable time clamping, in accordance with an embodiment of the invention.

FIG. 4 is a timing diagram illustrating various signals of a power supply over several switching cycles, in accordance with an embodiment of the implementation. FIG. 5 is a flow chart illustrating a process 500 of variable time clamping, in accordance with an embodiment of the implementation. The operation of controller 235 will now be described with reference to FIGS. 2-5.

In a process block 505, the power switch (e.g., MOSFET 295) is enabled in response to drive signal $U_{DRIVE}$. In response to the drive signal $U_{DRIVE}$, indicating the enabling of the power switch, VTC 350 enables switch T3 to discharge the timing capacitor $C_T$ in process block 510. In process block 515, the discharging of capacitor $C_T$ causes the capacitor voltage $V_C$ to drop to approximately zero volts, thereby causing inverter 305 to enable (i.e., close) clamp switch T1. Process blocks 505, 510 and 515 represent the beginning of the first clamp time $T_{CLAMP1}$, which is illustrated in FIG. 4 as being at time T0.

In process block 520 current limit comparator 240 of FIG. 2 receives the current sense signal $U_{ISENSE}$. In decision block 525 a determination is made by current limit comparator 240 whether the switch current $I_{SW}$ has reached the current limit as represented by the received current limit signal $U_{ILIM}$. As shown in FIG. 4, for the first switching period $T_{SW1}$, control circuit 255 has set the variable current limit to a first threshold current limit $TH_1$. Thus, in decision block 525, once the switch current $I_{SW}$ is greater than the current limit indicated by the current limit signal $U_{ILIM}$, then AND gate 245 generates the OFF signal $U_{OFF}$ to disable the power switch. In particular, in process block 530 and in response to receiving the OFF signal $U_{OFF}$, control circuit 255 disables the drive signal generator 220 (e.g., AND gate 220) which causes the drive signal $U_{DRIVE}$ to go low and to disable the power switch.

The switch current $I_{SW}$ reaching the current limit threshold $TH_1$ and the disabling of the power switch with the transition of the drive signal $U_{DRIVE}$ from a high logic state to a low logic state is shown in detail in FIG. 4 at time t1. As can be seen from FIG. 4, the bias voltage $V_{BIAS}$ remains a negative voltage for a period of time after time t1 even though the power switch was turned off at time t1. Thus, in process block 530 and at time t1, switch T2, of FIG. 3, is enabled to begin charging timing capacitor $C_T$ with current 315.

As discussed above, current 315 is representative of the current limit signal $U_{ILIM}$. Decision block 540 includes determining whether the voltage $V_C$ on the timing capacitor $C_T$ has reached voltage threshold $V_T$. In one example, the time that it takes timing capacitor $C_T$ to reach the voltage threshold $V_T$ is shown in FIG. 4 as a first delay time $t_{D1}$. In one example, the first delay time $t_{D1}$ is equal to the time it takes the bias voltage $V_{BIAS}$ to transition from a negative voltage to at least a zero voltage (e.g., time t2-t1). Once the capacitor voltage $V_C$ reaches the voltage threshold $V_T$, control signal generator 305 generates the control signal 291 to open the clamp switch T1 and thereby ends the first clamp time $t_{CLAMP1}$ at time t2.

As is further shown in FIG. 4, for subsequent switching periods (i.e., switching period $T_{SW2}$), the controller may include a higher threshold second current limit $TH_2$ than was used in the first switching period $T_{SW1}$. Thus, the switch current $I_{SW}$ is allowed to have a higher maximum value during the second switching period $T_{SW2}$ than was allowed in the first switching period $T_{SW1}$. As discussed above, the time that it takes the bias voltage to transition from a negative value to a non-negative value varies, dependent upon, at least, the maximum switch current through the power switch. In particular, the larger the maximum switch current, the quicker the transition of the bias voltage $V_{BIAS}$.

As illustrated in FIG. 4, using a higher threshold second current limit $TH_2$ for the second switching period $T_{SW2}$ results in the transition time of the bias voltage $V_{BIAS}$, from time t4 to time t5, being less than it was in the first switching period $T_{SW1}$. Since, as previously discussed, the current 315 used to charge timing capacitor $C_T$ is representative of the current limit, then the magnitude of current 315 in the second switching period $T_{SW2}$ is also larger than the magnitude of current 315 utilized in the first switching period $T_{SW1}$. This larger magnitude of current 315 in the second switching period $T_{SW2}$ results in the timing capacitor $C_T$ charging quicker and thereby reducing the delay time. Thus, the illustrated second delay time $t_{D2}$ is less than the first delay time $t_{D1}$.

The above description of illustrated embodiments, including what is described in the Abstract, is not intended to be exhaustive or to limit the invention to the precise forms disclosed. While specific embodiments of, and examples for, the implementations are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An integrated circuit for use in a power supply, the integrated circuit comprising:
    a feedback terminal to be coupled to receive a feedback signal;
    a controller to be coupled to enable or disable the conduction of a power switch during a switching cycle in response to the feedback signal, wherein the controller includes a current limit comparator coupled to terminate the conduction of the power switch during an enabled switching cycle in response to a current through the power switch exceeding a variable current limit; and
    a variable time clamp (VTC) included in the controller and coupled to clamp the feedback terminal to a voltage for a clamp time that is responsive to the variable current limit.

2. The integrated circuit of claim 1, wherein the clamp time is equal to an ON time of the power switch plus a delay time.

3. The integrated circuit of claim 2, wherein the delay time is proportional to the variable current limit.

4. The integrated circuit of claim 2, wherein the VTC includes:
    a clamp switch; and
    a variable time clamp (VTC) timer coupled to control the clamp switch in response to a current limit signal to selectively couple the feedback terminal to an input return of the power supply for the clamp time.

5. The integrated circuit of claim 4, wherein the power switch is a metal oxide semiconductor field effect transistor (MOSFET) having a source terminal, and wherein the VTC timer is coupled to control the clamp switch to selectively couple the feedback terminal to the source terminal.

6. The integrated circuit of claim 4, wherein the VTC timer is coupled to generate a control signal to disable the clamp switch after the delay time.

7. The integrated circuit of claim 6, wherein the VTC timer includes:
    a capacitor coupled to receive a current representative of the current limit; and
    a control signal generator coupled to generate the control signal to disable the clamp switch in response to a voltage on the capacitor reaching a voltage threshold.

8. The integrated circuit of claim 7, wherein the VTC further includes:
    a first switch coupled to provide the current representative of the current limit to the capacitor in response to a disabling of the power switch; and
    a second switch coupled to discharge the capacitor in response to an enabling of the power switch.

9. The integrated circuit of claim 1, wherein the controller comprises a control circuit coupled to generate a current limit signal representative of the variable current limit in response to the feedback signal, and wherein the feedback signal is representative of an input of the power supply when the power switch is conducting and is representative of an output of the power supply when the power switch is not conducting.

10. The integrated circuit of claim 1, wherein power switch is included in the integrated circuit.

11. A power supply, comprising:
    an energy transfer element coupled to transfer energy from a primary side of the power supply to a secondary side of the power supply, wherein the primary side is galvanically isolated from the secondary side;
    a power switch coupled to control the transfer of energy through the energy transfer element; and
    an integrated circuit coupled to control the switch, wherein the integrated circuit includes:
        a feedback terminal to be coupled to receive a feedback signal;
        a controller coupled to enable or disable the conduction of the power switch during a switching cycle in response to the feedback signal, wherein the control circuit includes a current limit comparator coupled to terminate the conduction of the power switch during an enabled switching cycle in response to a current through the power switch exceeding a variable current limit; and
        a variable time clamp (VTC) included in the controller and coupled to clamp the feedback terminal to a voltage for a clamp time that is responsive to the variable current limit.

12. The power supply of claim 11, wherein the clamp time is equal to an ON time of the power switch plus a delay time.

13. The power supply of claim 12, wherein the delay time is proportional to the variable current limit.

14. The power supply of claim 12, wherein the VTC includes:
a clamp switch; and
a variable time clamp (VTC) timer coupled to control the clamp switch in response to a current limit signal to selectively couple the feedback terminal to a common reference terminal of the power supply for the clamp time.

15. The power supply of claim 14, wherein the clamp switch is a metal oxide semiconductor field effect transistor (MOSFET) having a source terminal, and wherein the VTC timer is coupled to control the MOSFET to selectively couple the feedback terminal to the source terminal.

16. The power supply of claim 14, wherein the VTC timer includes:
a capacitor coupled to receive a current representative of the current limit; and
a control signal generator coupled to generate a control signal to disable the clamp switch in response to a voltage on the capacitor reaching a voltage threshold.

17. The power supply of claim 16, wherein the VTC further includes:
a first switch coupled to provide the current representative of the current limit to the capacitor in response to a disabling of the power switch; and
a second switch coupled to discharge the capacitor in response to an enabling of the power switch.

18. The power supply of claim 11, wherein the energy transfer element includes a bias winding to generate a bias voltage representative of an input of the power supply when the power switch is conducting and representative of an output of the power supply when the power switch is not conducting, wherein the feedback signal is a voltage proportional to the bias voltage when the power switch is not conducting.

19. The power supply of claim 18, wherein the feedback signal is a current proportional to the bias voltage when the power switch is conducting.

20. The power supply of claim 11, wherein power switch is included in the integrated circuit.

21. A method, comprising:
receiving a current sense signal representative of a current flowing through a power switch of a power supply;
disabling conduction of a power switch of the power supply during an enabled switching cycle in response to the current through the power switch exceeding a variable current limit; and
enabling conduction of the power switch and in response thereto, clamping a feedback terminal to a voltage for a clamp time that is responsive to the variable current limit.

22. The method of claim 21, wherein the clamp time is equal to an ON time of the power switch plus a delay time.

23. The method of claim 22, wherein clamping the feedback terminal to a voltage includes closing a clamp switch to couple the feedback terminal to a common reference terminal of the power supply, the method further comprising:
beginning charging of a capacitor with a current in response to the disabling of the power switch, wherein the current is representative of the variable current limit; and
opening the clamp switch to decouple the feedback terminal from the common reference terminal when a voltage on the capacitor reaches a threshold voltage, wherein the delay time is a time that it takes the capacitor to charge to the threshold voltage.

24. The method of claim 23, discharging the capacitor in response to the enabling of the power switch.

25. The method of claim 22, wherein the delay time is proportional to the variable current limit.

* * * * *